(12) United States Patent
Johansson et al.

(10) Patent No.: US 9,178,876 B1
(45) Date of Patent: Nov. 3, 2015

(54) STRENGTH-BASED PASSWORD EXPIRATION

(75) Inventors: Jesper M. Johansson, Redmond, WA (US); Dominique I. Brezinski, Seattle, WA (US); Kenneth L. Hamer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 295 days.

(21) Appl. No.: 13/277,423

(22) Filed: Oct. 20, 2011

(51) Int. Cl.
*H04L 29/06* (2006.01)
*H04L 9/08* (2006.01)

(52) U.S. Cl.
CPC ........... *H04L 63/0846* (2013.01); *H04L 9/0863* (2013.01)

(58) Field of Classification Search
CPC ... H04L 63/0846; H04L 9/088; H04L 9/0863; H04L 29/06795; G06F 21/46
USPC ........................... 713/183, 184; 726/6, 18, 19
See application file for complete search history.

(56) References Cited

U.S. PATENT DOCUMENTS

| | | | |
|---|---|---|---|
| 7,685,431 B1 | 3/2010 | Mullany | |
| 8,127,141 B2 * | 2/2012 | Hypponen | 713/184 |
| 8,386,238 B2 * | 2/2013 | Spataro | 704/9 |
| 2008/0114986 A1 * | 5/2008 | Morris et al. | 713/183 |
| 2011/0083172 A1 * | 4/2011 | Heim et al. | 726/6 |
| 2012/0180124 A1 * | 7/2012 | Dallas et al. | 726/22 |
| 2013/0055379 A1 * | 2/2013 | Adams et al. | 726/18 |

OTHER PUBLICATIONS

Burr et al., NIST Special Publication 800-63, Version 1.0.2: Electronic Authentication Guideline, Recommendations of the National Institute of Standards and Technology, NIST Pub., Apr. 2006, pp. 1-54.*

* cited by examiner

*Primary Examiner* — Eleni Shiferaw
*Assistant Examiner* — Paul Callahan
(74) *Attorney, Agent, or Firm* — Davis Wright Tremaine LLP

(57) ABSTRACT

This disclosure is directed to, in part, determining an expiration of a password or other security data based on a measured complexity of the password or the security data. A user may enter a password to be associated with an account or a resource (e.g., a login for a user account, etc.). The password may be analyzed to determine an entropy value of the password, which is a measure of complexity of the password. A password manager may then determine an expiration of the password based on the entropy value of the password. Thus, a more complex password may be assigned an expiration date that is longer than an expiration date assigned to a less complex password. In some aspects, the expiration date may be dynamically updated as a user continues to enter inputs for a new password.

19 Claims, 8 Drawing Sheets

STRENGTH-BASED PASSWORD EXPIRATION

BACKGROUND

Personal accounts or other resources are often protected by passwords that, when known by a user, allow access to the account or resource. For example, financial accounts, e-mail accounts, and other types of accounts often require a user to maintain and use a username and password or other security credentials to access and use the accounts. In addition, some computing devices and other resources require passwords. For example, a computing device's operating system may require entry of a correct password to attain increased functionality of the computing device. In another example, a safe may use an electronic password to protect against unauthorized access to the contents of the safe. Sometimes these passwords are subject to an expiration after a passage of time. Typically passwords expire at a fixed time after selection of the password (e.g., 90 days, 1 year, etc.). The fixed time is often set by an administrator and has a same duration for all users.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to, in part, determining an expiration of a password or other security data based on a measured complexity of the password or the security data. Many resource administrators require regular password expiration intervals (e.g., dates or times). Typically these expirations are set at 90 days or 180 days, meaning that every three to six months a user is asked to change his or her password. A problem with this approach is that it treats all passwords as having a same level of complexity, which is often untrue. A password such as "password" or "12345678" is not nearly as complex or strong as a password such as "#GdwfIF~kd(*#>."

The latter example is both longer and has a larger character set (greater entropy) and therefore would require more time to guess the password that the former examples. It stands to reason, therefore, that the user with the latter password should be allowed to keep it longer than the user that selects one of the less complex or weaker passwords.

As described herein, a user may enter a password to be associated with an account or a resource (e.g., a login for a user account, etc.). The password may be analyzed to determine an entropy value of the password, which is a measure of complexity of the password. A password manager may then determine an expiration of the password based on the entropy value of the password. Thus, a more complex password may be assigned an expiration date that is longer than an expiration date assigned to a less complex password. The expiration date can be communicated to the user before setting the password to permit the user to change the password or select a more complex password if he or she so wishes. In some embodiments, the expiration date may be dynamically updated as a user continues to enter inputs for a new password. For example, the expiration data move further out in the future as the user continues to add new symbols and characters to a new password when the complexity is a measurement of a length of the password.

One benefit of these techniques and systems is that it causes weak passwords to expire in less time than stronger passwords, which increases security of the account or the resource. These techniques and systems may also encourage users to select stronger passwords by letting them keep strong passwords longer than weak passwords. This makes it more palatable to select a complex password.

The techniques and systems described herein may be implemented in a number of ways. Example implementations are provided below with reference to the following figures.

Illustrative Environment

Figure 1:
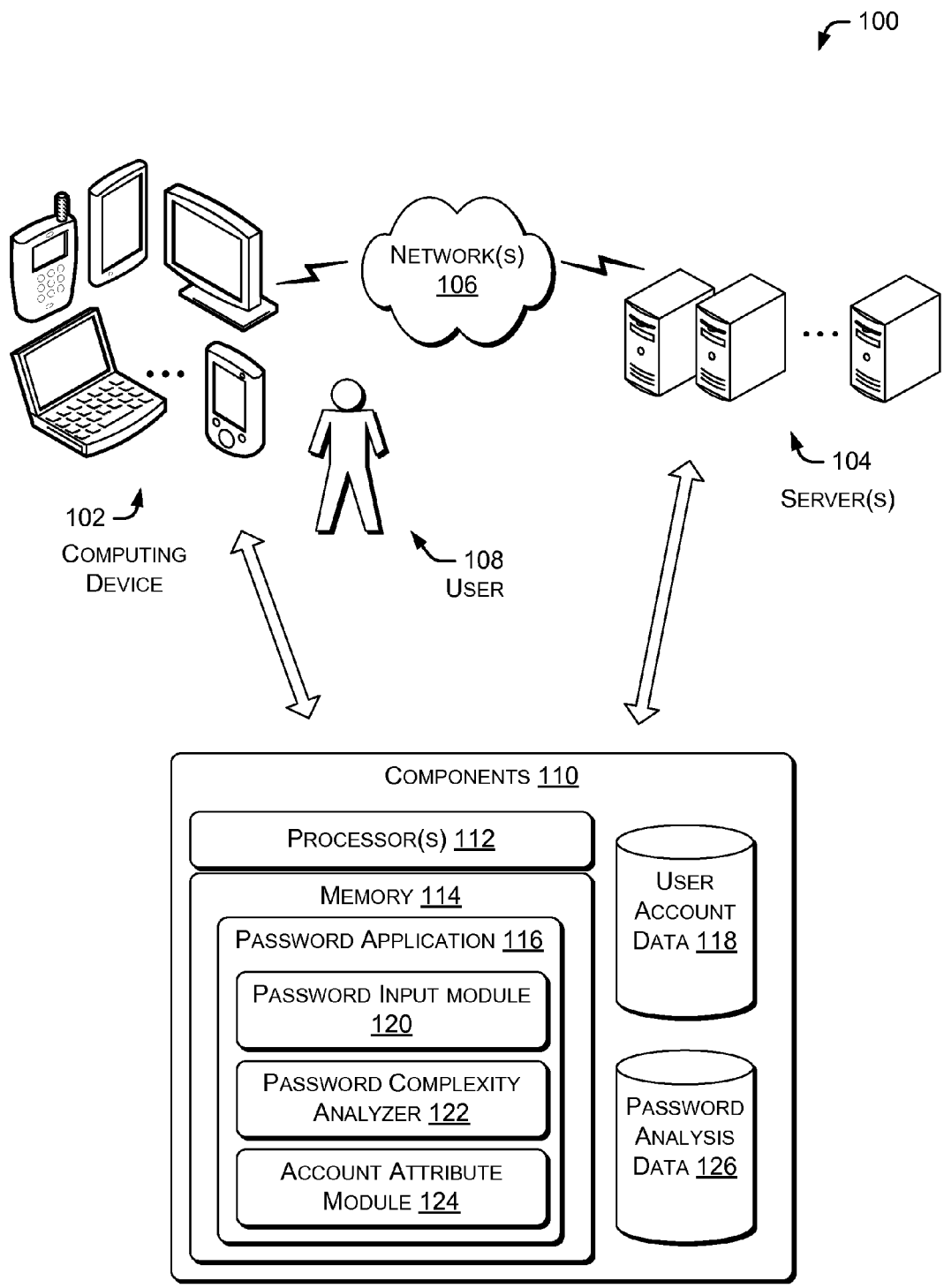
FIG. 1 is a schematic diagram of an illustrative computing environment to provide strength-based password expiration.

FIG. 1 is a schematic diagram of an illustrative computing environment 100 to provide strength-based password expiration. As discussed herein, a password is any secret information, such as a shared secret, user password, a username, a personal identification number (PIN), a cryptography key, or other security data that may be subject to an expiration date to improve security of the data.

The environment 100 includes a computing device 102. The computing device 102 may include a personal computer, an electronic book reader device, a tablet computer, a mobile telephone (including a smart phone), a personal digital assistant (PDA), a television, a set top box, a gaming console, or another electronic, portable or handheld device. In some embodiments, the computing device 102 may be in communication with one or more server(s) 104 through one or more network(s) 106. The server(s) 104 may host data, such as user accounts, financial information, ecommerce marketplaces, reference data, electronic mail (e-mail) accounts, messaging accounts, social networks, or any other type of data or computing resources. A user 108 may use the computing device 102 independent from the server(s) 104 or the user 108 may use the computing device 102 to access information from the server(s) 104. The network(s) 106 are representative of many different types of networks, such as cable networks, the Internet, local area networks, mobile telephone networks, wide area networks, wireless networks, or a combination of such networks.

As illustrated, the computing device 102, the server(s) 104, or both may include various components 110. For example, the computing device 102 and the server(s) 104 may include separate versions of the components 110 which are stored by the respective devices.

In some embodiments, the components 110 include one or more processor(s) 112 and memory 114. The processor(s) 112 interact with the memory 114 to execute instructions and facilitate operation of the computing device 102 and/or the server(s) 104. The memory 114 may include software programs or other executable modules that may be executed by the processor(s) 112. Examples of such programs or modules include operating systems, applications (or "apps"), web browsers, program managers, and so forth. The memory 114 may also be used to store data, such as data files, audio and/or video media, documents, or the like.

The memory 104 may include volatile memory (such as RAM), nonvolatile memory, removable memory, and/or non-removable memory, implemented in any method or technology for storage of information, such as computer-readable instructions, data structures, program modules, or other data. Also, the processor(s) 112 may include onboard memory in addition to or instead of the memory 114. Some examples of storage media that may be included in the memory 114 and/or processor(s) 112 include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by the computing device 102 and/or the server(s) 104. Any such computer-readable media may be part of the computing device 102 and/or the server(s) 104.

In accordance with one or more embodiments, the memory 114 may include a password application 116. The password application 116 may interact with user account data 118 to manage creation, storage, and use of a password (or other security data). The password application 116 may include a password input module 120, a password complexity analyzer 122, and an account attribute module 124, each described in turn.

The password input module 120 may receive an input of a password. The password input module 120 may prompt the user 108 to enter a password when creating an account or to enter a new password when an existing password has expired or is about to expire.

The password complexity analyzer 122 may analyze the password received by the password input module to determine an entropy level associated with the password (or part of the password during input of the password). The password complexity analyzer 122 may select from various available measurement techniques to measure a relative strength of the password. In some embodiments, the measurement may be based in part on an estimated amount of guesses necessary to determine the password. The password complexity analyzer 122 may use password analysis data 126 to create the measurement. The password analysis data 126 may include a dictionary of passwords (e.g., a crack dictionary, etc.) or other relevant data to determine the entropy value for the password. The password complexity analyzer 122 may also determine a symbol set used in the password, such as types of characters used, word or phrase combinations, and/or other attributes of a password when determining a measurement of the entropy value of the password. In some embodiments, the password complexity analyzer 122 may reevaluate the password after subsequent inputs by a user, which are received by the password input module 120, thereby dynamically updating the entropy value of the password input.

The account attribute module 124 may determine an account attribute based at least in part on the entropy value (complexity) of the password (or input of the password). For example, the account attribute may be an expiration of the password, an lockout threshold valued used when the user 106 incorrectly enters the password during a login attempt, access privileges associated with the password, or other account attributes. In various embodiments, the account attribute module 124 may reevaluate the entropy value after subsequent inputs by a user, thereby dynamically updating the account attribute or account attributes for a password input.

Figure 2:
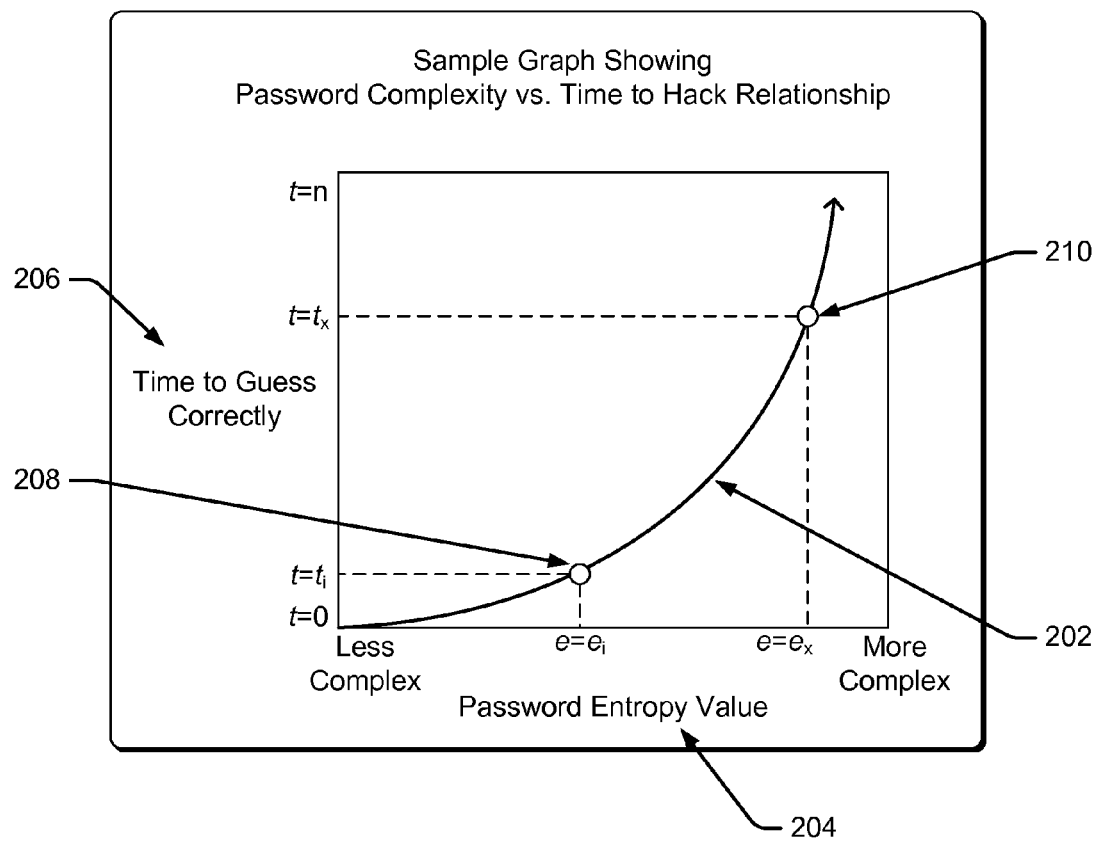
FIG. 2 is an illustrative graph that shows a sample relationship between a measured complexity of a password and an estimated time to correctly guess the password.

FIG. 2 shows an illustrative graph 200 that plots password data 202 having a sample relationship between a measured complexity of a password and an estimated time to correctly guess the password. The password data 202 may include a password entropy value 204 that may be used to represent a relative complexity of a password. The password entropy value 204 may be expressed in bits and represent a difficulty to guess a password. The password entropy value 204 may be associated with an estimated time 206 to correctly guess the password. For example, the time 206 may represent an estimated time to guess the password using a brute force search or exhaustive search which tries all possible password combinations for a given set of characters, symbols, words, etc. As shown in the illustrative graph 200, the password data 202 may form a logarithmic curve where the time 202 increases faster for each incremental entropy value as the password data 202 is traced toward the right side of the illustrative graph 200 (in the direction of increased entropy value 204).

A first data point 208 on the plot of the password data 202 may include time of $t_i$ and an entropy value of $e_i$. A second data point 210 on the plot of the password data 202 may include time of $t_x$ and an entropy value of $e_x$. Due to the relationship between the entropy values and the estimated time to correctly guess the password, a doubling of the entropy value between $e_i$ and $e_x$ may lead to an exponential increase in the time between $t_i$ and $t_x$. In accordance with this disclosure, the account attribute module 124 may allow the user 106 to retain a password for a longer period of time when the password has the entropy value of $e_x$ than when the password has the entropy value of $e_i$. For example the password expiration for the password associated with the entropy value $e_x$ may be many times longer as the expiration associated with the password having the entropy value of $e_i$.

Illustrative Operation

FIGS. 3-7 show illustrative processes performed by the password application 116. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
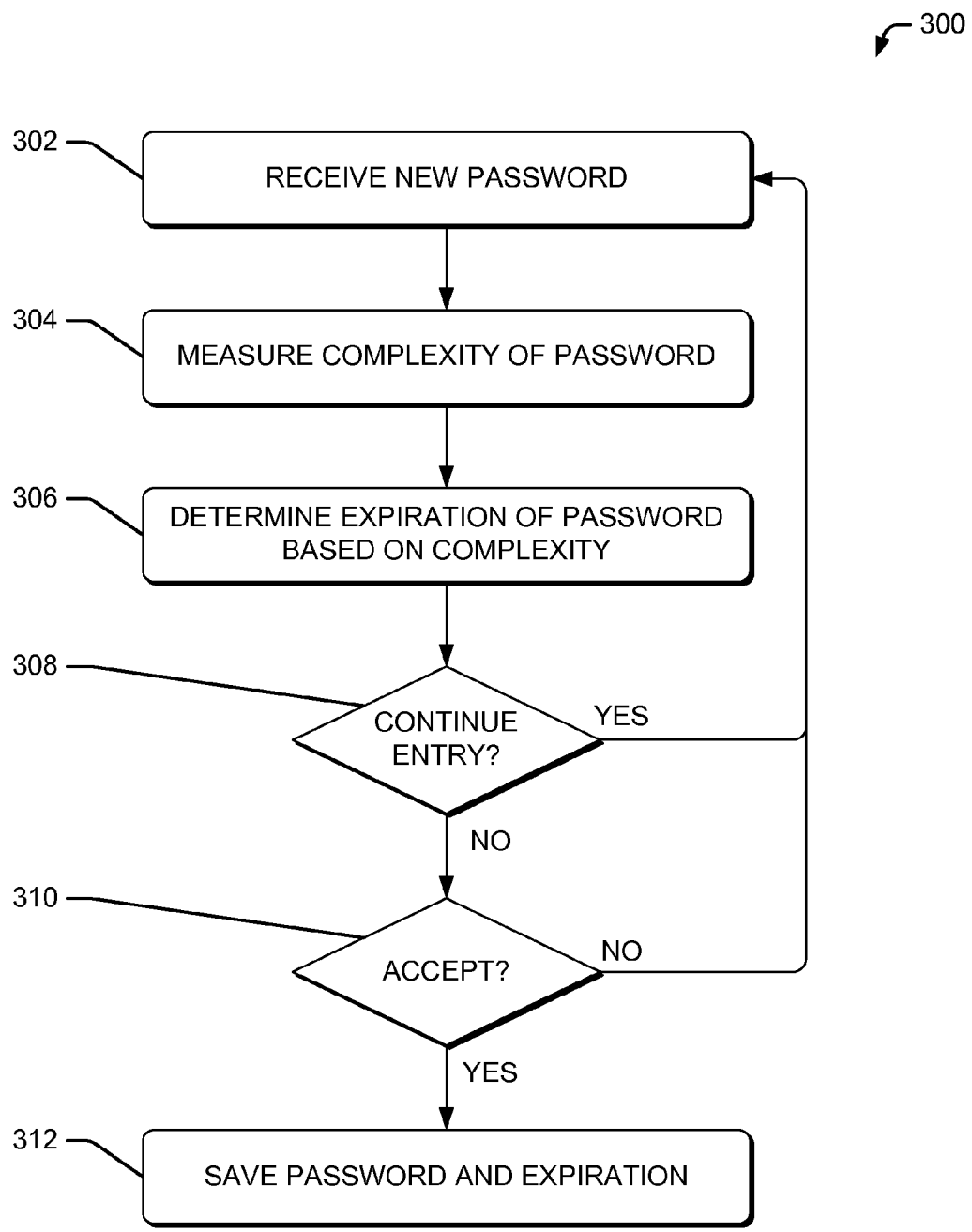
FIG. 3 is a flow diagram of an illustrative process to determine an expiration of a password based on a measured complexity of a received password.

FIG. 3 is a flow diagram of an illustrative process 300 to determine an expiration of a password based at least in part on a measured complexity of a received password. The process 300 is described with reference to the environment 100 and may be performed by the password application 116. Of course, the process 300 (and other processes described herein) may be performed in other similar and/or different environments.

At 302, the password input module 120 may receive a new password entry for the user 106. The new password entry may be a complete password or a part of a password as the user 106 inputs additional symbols, characters, words, or other additions to the password.

At 304, the password complexity analyzer 122 may measure or determine a complexity of the password (or part of the password) received at the operation 302. The password complexity analyzer 122 may determine the complexity as an entropy value based on a symbol set used to create the password (e.g., text, numbers, symbols, punctuation, words, or any combination thereof, etc.). The entropy value may, but not necessarily, be associated with the length of the password. For example, an entry of "tige" may have a greater entropy value than an input of "tiger" because "tiger" is an English word and may be classified in as part of a smaller symbol set than a random combination of letters as "tige" that do not create an English word. Thus, dynamic calculations of the entropy values may not necessary always increase with the addition of inputs, such as by the addition of the "r" to change "tige" to "tiger."

At 306, the account attribute module 124 may determine or calculate an expiration of the password based on the entropy value. For example, a new password or password input may include a longer time period before expiration of the password when the password is measured to have a high entropy value (complex) as compared to a simple password with a low entropy value (simple and easier to guess). For example, the account attribute module 124 may assign an expiration of one year for a password such as "#du&R)/m1*7" (which may have an entropy value of 72 bits based on a symbol set of 95 for all ASCII printable characters) and only assign an expiration of one week for a password such as "bluecow" (which may have an entropy value of 25 bits based on a symbol set of 7776 for a diceware word list). The password complexity analyzer 122 may use the password analysis data 126 to determine the symbol set, a word list, a crack dictionary, the entropy value, or other data relevant to a complexity of a password.

At 308, the password application 116 may determine whether the password entry is to be continued (e.g. based on user input or other triggers). When the password entry is to continue (following the "yes" route), then the process 300 may continue at the operation 302. When the password entry is discontinued (following the "no" route), then the process may advance to a decision operation 310.

At 310, the password application 116 may determine whether the use desires to accept the password input. When the password input is not accepted (following the "no" route), then the process 300 may continue at the operation 302. In some instances, the password application may reset the password following the "no" route from the decision operation 310. When the password input is accepted (following the "yes" route), then the process 300 may continue to at the operation 312.

At 312, the password application 116 may save the password and the expiration determined for the password from the operation 306. The password and expiration may be stored in the user account data 118. In some embodiments, the password application may also store at least one function that generates the expiration of the new password using the entropy value. In various embodiments, the expiration may be revised by modifying the function used to determine the expiration of the new password. For example, the function may be updated when new hardware is introduced or made available that may accelerate discovery (guessing) of a password or otherwise compromise access to privileged information.

As discussed here, the password may also be other secure data. For example, the password may be a cryptography key used for authentication of data that is exchanged by different computing devices. The cryptography keys may be updated at various times and may also be tested for complexity and assigned an expiration date in accordance with the process 300. Other secure data that is subject to an expiration date may have the expiration determined by the process 300.

Figure 4:
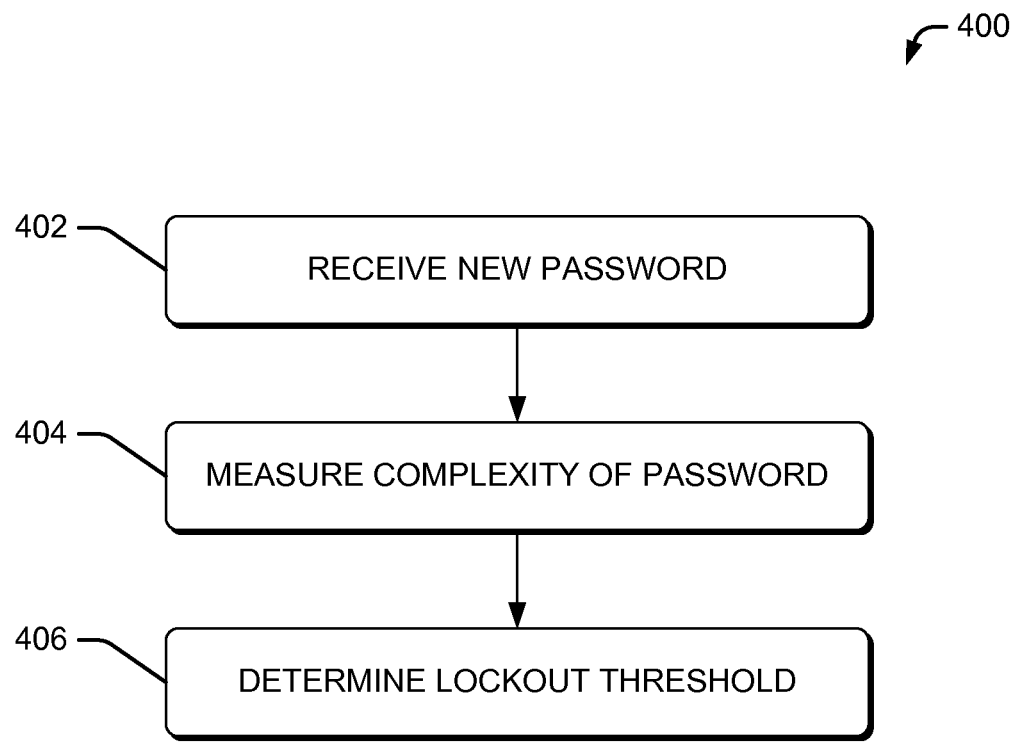
FIG. 4 is a flow diagram of an illustrative process to determine a lockout threshold based on a measured complexity of a received password.

FIG. 4 is a flow diagram of an illustrative process 400 to determine a lockout threshold based on a measured complexity of a received password. Operations 402 and 404 may be performed in a similar manner as described above for the operations 302 and 304, respectively. For example, a user may create a new account and input a new password at the operation 402. At 404, the password complexity analyzer 122 may determine an entropy value for the new password.

At 406, the account attribute module 124 may determine a lockout threshold for the new password. The lockout threshold may be a number of times the user 106 can incorrectly enter the password (once the password is assigned and in use by the user) before a requested account is locked or the entry is denied for a predetermined amount of time. In some embodiments, the lockout threshold may be concealed from users during entry of the assigned password during a login operation to prevent the users from obtaining information about the password (e.g., misuse, fraud, etc.). The lockout threshold may be stored in the user account data 118 and associated with the new password after the password is accepted for use by the user 106.

Figure 5:
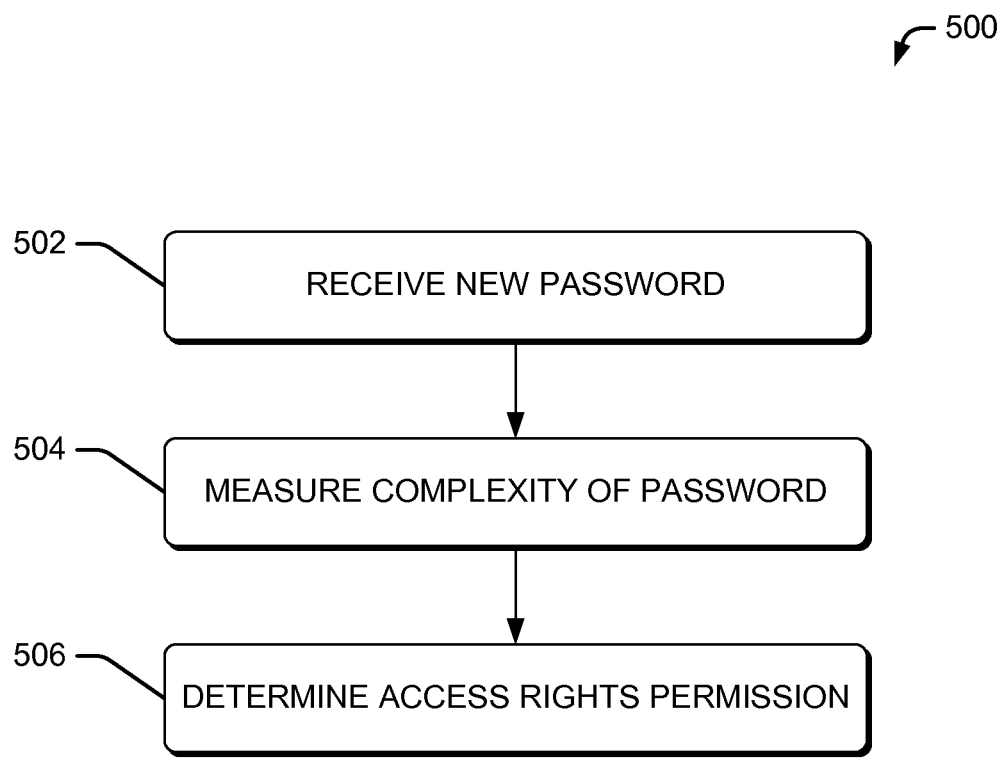
FIG. 5 is a flow diagram of an illustrative process to determine access rights granted for a password based on a measured complexity of a received password.

FIG. 5 is a flow diagram of an illustrative process 500 to determine access rights granted for a password based on a measured complexity of a received password. Operations 502 and 504 may be performed in a similar manner as described above for the operations 302 and 304, respectively.

At 506, the account attribute module 124 may determine an access rights permission for the new password. The access rights permission may provide access to or restrict the user from accessing part of an account (or other secure information). For example, in an operation system example, the access rights permission may include privileges of an administrator and a standard user (non-administrator). In some embodiments, the account attribute module 124 may remove administrator privileges from a user by changing the access rights permission when the user's password is not very complex in accordance with the process 500 (e.g., has an entropy value less than a threshold entropy value). However, in some instances the corollary may not hold true unless the user is eligible for administrative privileges. The access rights permission may be stored in the user account data 118 and associated with the new password after the password is accepted for use by the user 106.

Figure 6:
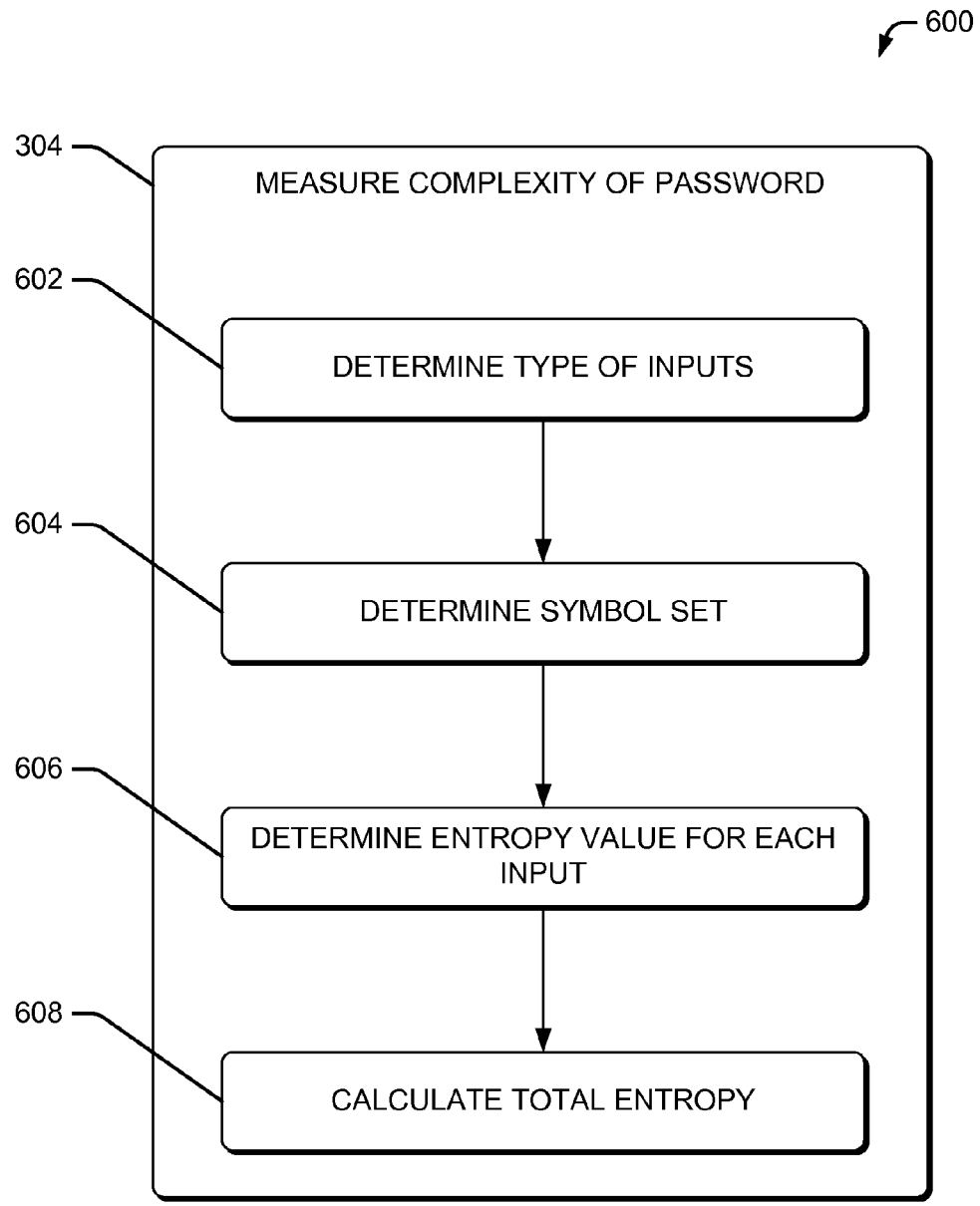
FIG. 6 is a flow diagram of an illustrative process to measure a complexity of a password.

FIG. 6 is a flow diagram of an illustrative process 600 to measure a complexity of a password. As discussed above, the password complexity analyzer 122 may determine a complexity of a password as an entropy value at the operation 304.

At 602, the password complexity analyzer 122 may determine a type of inputs in a password. The types of inputs may be inputs of symbols in a symbol set, such as the Latin alphabet (lower case and/or uppercase), Arabic numerals, hexadecimal numerals, ASCII characters, Unicode inputs, diceware word list (e.g., five dice, etc). The symbol set may also include other defined groups of inputs, such as a row of keys on a QWERTY keyboard, languages (e.g., when categorizing words, etc.), or other definable groups of inputs or words.

At 604, the password complexity analyzer 122 may classify the inputs as one of the symbol sets. Each symbol set may include a count of possible inputs in the symbol set, such as 10 inputs in Arabic numerals.

At 606, the password complexity analyzer 122 may determine an entropy value for the determined symbol set. For example, the entropy value for the Arabic numerals may be 3.3 bits for each input.

At 608, the password complexity analyzer 122 may calculate a total entropy value for the password or part of the password entered by the user 106. Thus an input of ten Arabic numerals (e.g., "2893041869" may have an entropy value of 33 bits. Each additional Arabic numeral added by the user may increase the entropy value 3.3 bits. However, if the user then adds a Latin alphabet input (e.g., the letter "J" in the password, the symbol set may change to a case sensitive alphanumeric symbol set with an entropy value of 5.9 bits per input. Thus the password complexity analyzer 122 may calculate a total entropy value for the password or part of the password using the new entropy value. Other calculations of the entropy value may also be used in accordance with this disclosure.

Figure 7:
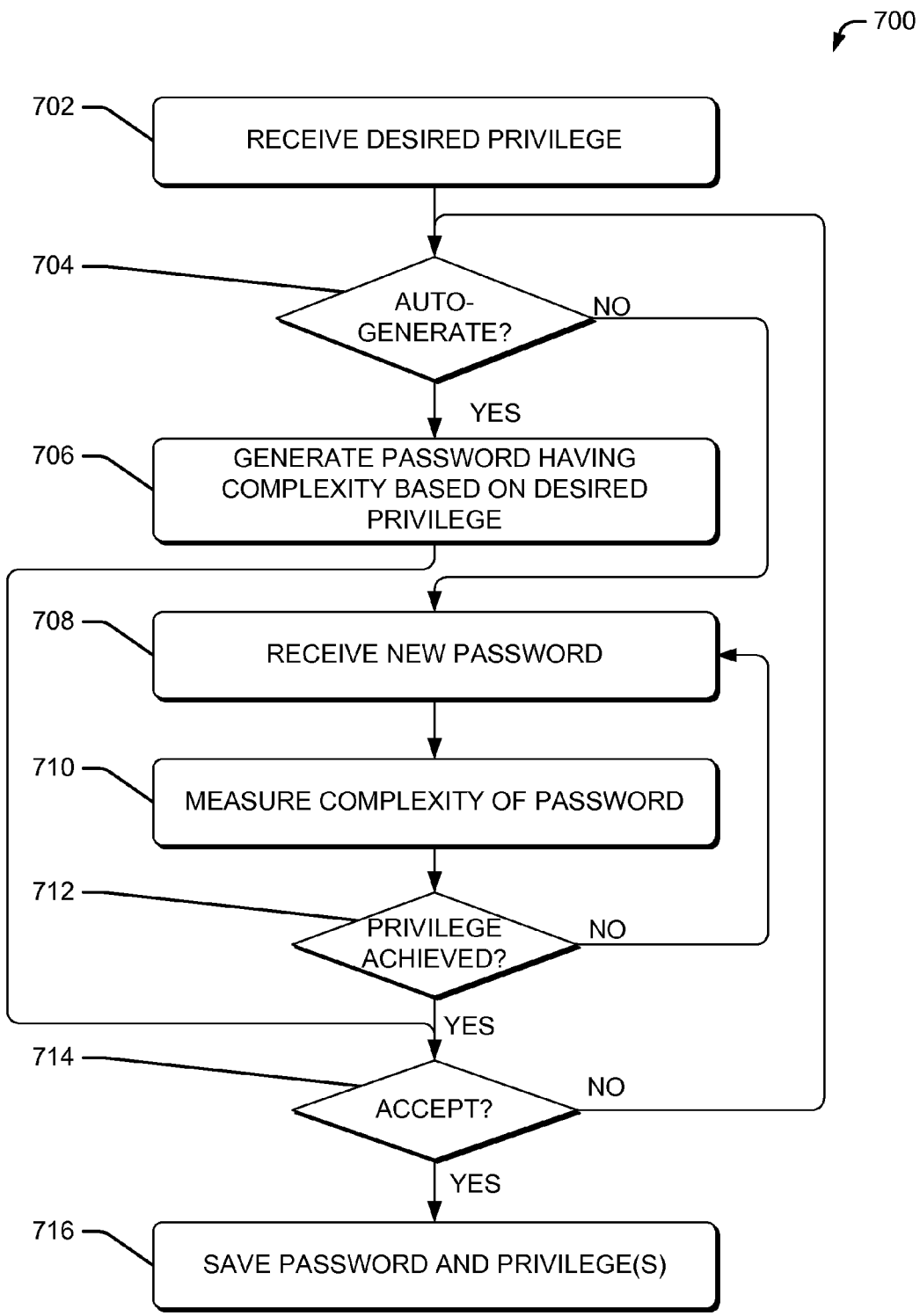
FIG. 7 is a flow diagram of an illustrative process to enable a user to create a password that conforms to a user-specified privilege.

FIG. 7 is a flow diagram of an illustrative process 700 to enable a user to create a password that conforms to a user-specified privilege. For example, the password application 116 may enable the user 106 to create a password that has lifespan greater than or equal to a user-specified duration using the process 700. The lifespan of the password may be determined by the difference between the issue date and the expiration date of the password.

At 702, the password application 116 may receive a desired privilege from the user 106 via a user input. For example, the password application 116 may receive a desired expiration value (or lifespan value) of a password, a desired lockout threshold, a desired access privilege, another desired privilege, or a combination thereof.

At 704, the password application 116 may determine whether to automatically generate the password having the desired privilege(s) received at the operation 702. When the password application 116 is instructed to automatically generate the password (such as after receipt of a user command) and following the "yes" route from the decision 704, then the payment application 116 may automatically generate the password having a complexity commensurate with the desired privilege(s) at 706. For example, the password complexity analyzer 122 and the password analysis data 126 may be used to assign a randomly generated password at the operation 706 that has an entropy value commensurate with the requested privilege(s).

When the automatic generation option is not selected at the decision operation 704 (following the "no" route), then the process 700 may proceed to the operation 708.

At 708, the password input module 120 may receive a new password or portion of a password being entered by a user. The operation 708 may be similar to the operation 302.

At 710, the password complexity analyzer 122 may measure a complexity of the password. The operation 710 may be similar to the operation 304.

At 712, the account attribute module 124 may determine whether the desired privilege(s) are achieved by the inputted password at the operation 708 using the measured complexity from the operation 710. When the privilege(s) are not achieved (following the "no" route), then the process 700 may advance to the operation 708 so the user may continue adding to the password or enter a new password. When the privilege(s) are achieved (following the "yes" route), then the process 700 may advance to a decision operation 714.

At 714, the password application 116 may determine whether the user accepts the password following the operation 706 (auto-generated password) or the operations 708-712 (user generated password). When the password application 116 may determines that the user does not accept the password (following the "no" route from the decision operation 714), then the process 700 may continue at the decision operation 704. When the password application 116 may determines that the user accepts the password (following the "yes" route from the decision operation 714), then the process 700 may continue at an operation 716.

At 716, the password application 116 may save the password and the expiration. The password and expiration may be stored in the user account data 118.

In some embodiments, the process 700 may enable the user to practice entry of the password prior to or after saving the password at the operation 716. For example, a user may desire to practice a password that is generated using the operation 706 before the user decides to save the password. The password input module 120 may communicate to the user whether the practice input of the password in a correct input of the password. If the password is difficult to input correctly or otherwise undesirable to the user, the user may then select a new password using the process 700.

Illustrative Interface

Figure 8:
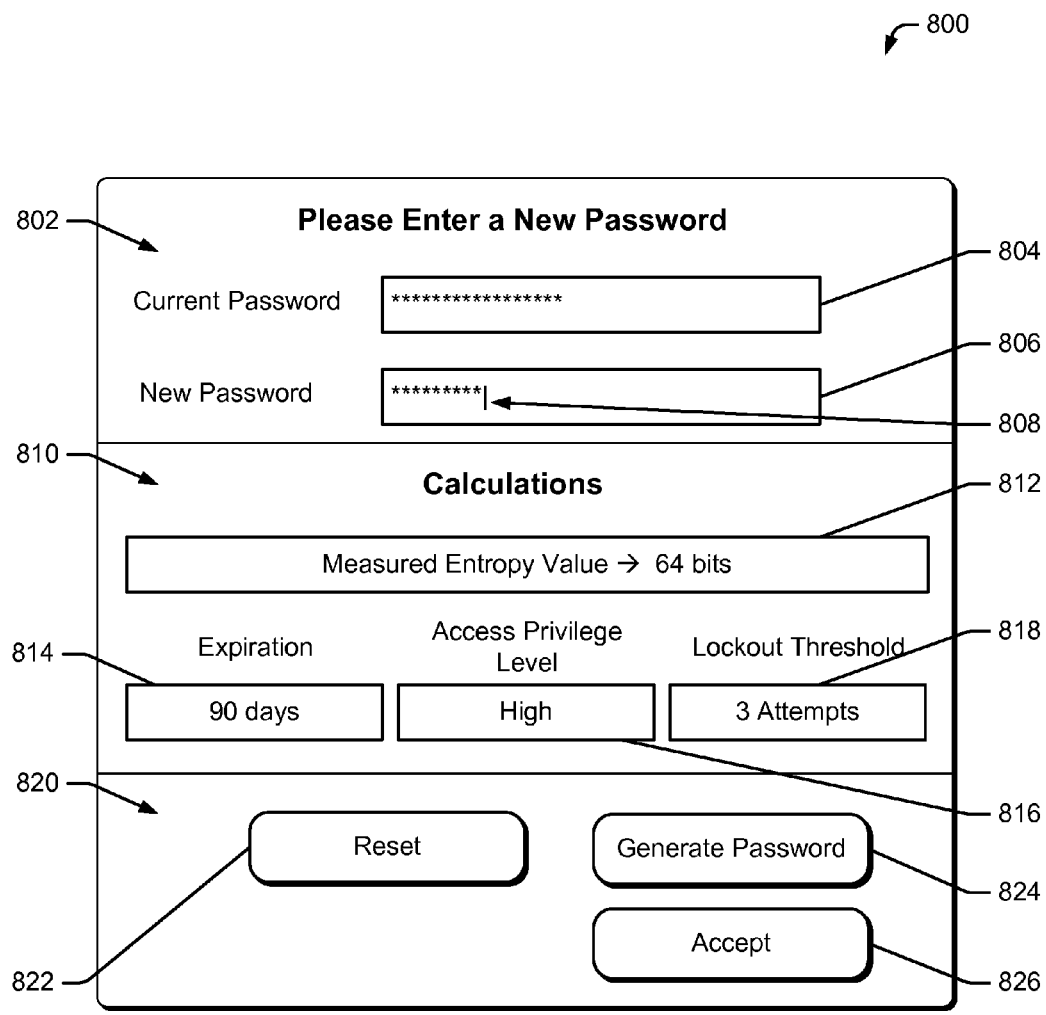
FIG. 8 is an illustrative user interface (UI) of a new password entry that includes a calculation of password entropy and one or more calculated attributes for the new password.

FIG. 8 is an illustrative user interface (UI) 800 of a new password entry that includes a calculation of password entropy and one or more calculated attributes for the new password. The UI 800 may allow interaction and receipt of input from the user 106 when performing any of the processes described with reference to FIGS. 3-7. The UI 800 may be presented by the computing device 102 or by the server(s) 104.

The UI 800 may include a new password section 802. The new password section 802 may include a current password field 804 and a new password field 806. The data input into the new password field 806 may be used in the operation 302 (and other similar operations) to receive the new password from the user 106. As shown in FIG. 8, the new password may still be entered by the user, as evident by a cursor 808 in the new password field 806.

In accordance with some embodiments, the UI 800 may include a calculations section 810. The calculations section 810 may include an entropy measurement field 812 that shows an entropy value measured by the password complexity analyzer 122, possibly using the process 600 shown in FIG. 6. In addition, the calculations section 810 may include one or more of an expiration field 814, an access privilege level field 816, or a lockout threshold field 818. The expiration field 814, the access privilege level field 816, and the lockout threshold field 818 may be populated by the account attribute module 124 based at least in part on the entropy value.

The UI 800 may also include a user-command section 820. The user-command section may include a reset command 822, a generate command 824, and an accept command 826. The reset command 822, when activated by the user 106, may reset a password such as by removing inputs in the new password field 806 or other fields in the UI 800. The generate command 824 may be used to generate the new password, possibly in the new password field 806, when the user inputs values into one or more of the expiration field 814, the access privilege level field 816, and the lockout threshold field 818 as described with reference to the process 700 shown in FIG. 7.

The accept command 826 may initiation the operation 312 or other similar operations to save the password and any of the privileges associated with the password.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer implemented method comprising:
under control of one or more computer systems configured with executable instructions,
receiving, by the one or more computer systems, inputs of a new password that is associated with an access privilege;
determining, by the one or more computer systems, a type of the inputs included in the new password;
determining, by the one or more computer systems, a symbol set associated with the type of the inputs;
determining, by the one or more computer systems, an entropy value for individual ones of the inputs based at least in part on the determined symbol set;
updating, by the one or more computer systems, a total entropy value as the inputs are received by, as a result of a latest input of the inputs being received, multiplying the determined entropy value by a quantity of the inputs received for the new password; and
dynamically determining, by the one or more computer systems, an expiration of the new password based at least in part on the updated total entropy value and as the inputs are received.

2. The method as recited in claim 1, further comprising causing the expiration to be presented prior to saving the new password.

3. The method as recited in claim 1, wherein the entropy value is measured in bits and the symbol set is determined by a number of possible inputs represented by the type of the inputs in the new password.

4. A method comprising:
receiving, by a computing device, an entry of a string of inputs as a new password that is associated with an access privilege;
measuring, by the computing device, a complexity of the string of inputs of the new password, wherein the measuring of the complexity of the string of inputs comprises:
determining, a respective entropy value for individual ones of inputs of the string of inputs based at least in part on a symbol set used in the individual ones of inputs, wherein the respective entropy value is different for at least two of the individual ones of inputs;
updating, as the string of inputs is received, the complexity of the string of inputs by summing instances of the respective entropy value for the individual ones of the inputs; and
dynamically determining, by the computing device, an expiration of the new password based at least in part on the complexity of the string of inputs.

5. The method as recited in claim 4, wherein the symbol set is a lower case Latin alphabet, a upper case Latin alphabet, a case sensitive Latin alphabet, a case insensitive Latin alphabet, a set of Arabic numerals, a Unicode character set, or a diceware word list.

6. The method as recited in claim 4, further comprising causing the expiration of the new password to be presented prior to storing the new password as an active password.

7. The method as recited in claim 4, further comprising determining a lockout threshold based at least in part on the complexity of the string of inputs, the lockout threshold being a quantity of allowable attempts to enter a correct password during a login session before restricting or ignoring additional attempts to enter the correct password during the login session.

8. The method as recited in claim 4, further comprising modifying the access privilege based at least in part on the complexity of the string of inputs.

9. The method as recited in claim 8, wherein the access privilege is modified to remove administrative rights when the new password has a complexity that is associated with an entropy level that is below an access privilege threshold value.

10. The method as recited in claim 4, wherein the access privilege allows use of a financial account, an operating system, a social network, or a messaging account.

11. A method, comprising:
determining, via one or more computing devices, an entropy value of a string of inputs of a shared secret, the entropy value for the string of inputs being based on a symbol set used in the string of inputs;
as a result of the string of inputs changing, updating a total entropy value for the changed string of inputs by multiplying the entropy value by a quantity of inputs of the changed string of inputs; and
dynamically determining as the string of inputs is received an expiration of the shared secret based at least in part on the total entropy value of the string of inputs.

12. The method as recited in claim 11, wherein the shared secret is at least one of a new password, a new username, a new personal identification number (PIN), or a new cryptographic key.

13. The method as recited in claim 11, wherein the determining the entropy value of the string of inputs of the shared secret is performed by using a lookup table that, for the symbol set, indicates a quantity of all possible entries of the string of inputs.

14. The method as recited in claim 11, wherein the entropy value is measured in bits.

15. One or more non-transitory computer-readable media storing computer-executable instructions that, when executed on one or more processors, performs acts comprising:
receiving an entry of a string of inputs as a new password that is associated with an access privilege;
as a result of receiving the entry:
determining an entropy value for individual inputs of the string of inputs of the new password, based on a symbol set used in the string of inputs;
updating, as the string of inputs is received, a total entropy value for the string of inputs by aggregating the entropy value of the individual inputs of the string of inputs; and
dynamically determining an expiration of the new password based at least in part on the total entropy value of the string of inputs.

16. The one or more non-transitory computer-readable media as recited in claim 15, further comprising presenting the expiration of the new password prior to storing the new password as an active password.

17. The one or more non-transitory computer-readable media as recited in claim 15, further comprising determining a lockout threshold based at least in part on the total entropy value of the string of inputs, the lockout threshold being a quantity of allowable attempts to enter a correct password during a login session before restricting or ignoring additional attempts to enter the correct password during the login session.

18. The one or more non-transitory computer-readable media as recited in claim 15, further comprising storing at least one function that generates the expiration of the new password from the total entropy value.

19. The one or more non-transitory computer-readable media as recited in claim 18, further comprising modifying the at least one function used to determine the expiration of the new password, the modified function to revise the expiration of the new password.

\* \* \* \* \*